United States Patent
Clark

(10) Patent No.: US 6,370,241 B1
(45) Date of Patent: *Apr. 9, 2002

(54) TELEPHONY SYSTEM FOR CALLING CARD CALLS

(75) Inventor: Theresa A. Clark, Superior, CO (US)

(73) Assignee: Quest Communications Int'l., Inc., Denver, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,363

(22) Filed: Dec. 23, 1997

(51) Int. Cl.[7] .................................. H04M 17/00
(52) U.S. Cl. ....................... 379/144.01; 379/114.15; 379/114.2; 379/142.07; 455/31.2
(58) Field of Search ................. 379/120, 127, 379/133–134, 111–113, 144, 154, 201, 142, 56, 127.01, 201.01, 142.01, 112.01, 114.15, 114.2, 142.07, 142.04, 144.01; 455/31.1–31.3, 38.1, 38.4; 348/825.44

(56) References Cited

U.S. PATENT DOCUMENTS

| | | | |
|---|---|---|---|
| 4,878,240 A | * 10/1989 | Lin et al. ....................... 379/67 |
| 5,224,150 A | * 6/1993 | Neustein | |
| 5,457,737 A | 10/1995 | Wen ............................. 379/62 |
| 5,473,667 A | * 12/1995 | Neustein | |
| 5,557,668 A | 9/1996 | Brady ........................ 379/212 |
| 5,563,937 A | 10/1996 | Bruno et al. ................. 379/201 |
| 5,588,037 A | 12/1996 | Fuller et al. .................. 379/57 |
| 5,594,776 A | 1/1997 | Dent ............................ 379/58 |
| 5,661,781 A | 8/1997 | Dejager ....................... 379/67 |
| 5,668,876 A | 9/1997 | Falk et al. .................... 380/25 |
| 5,673,299 A | 9/1997 | Fuller et al. .................. 379/57 |
| 5,673,306 A | 9/1997 | Amadon ...................... 379/59 |
| 5,675,627 A | 10/1997 | Yaker et al. .................. 379/57 |
| 5,721,768 A | * 2/1998 | Stimson et al. ............. 379/114 |
| 5,754,630 A | * 5/1998 | Srinivasan ................... 379/88 |
| 5,845,211 A | * 12/1998 | Roach | |
| 5,903,636 A | * 5/1999 | Malik ......................... 379/142 |
| 5,953,398 A | * 9/1999 | Hill | |

OTHER PUBLICATIONS

Rowland, Elaine, "Calling card platforms; selling prepaid telephone calling cards," Aug. 1997.

* cited by examiner

Primary Examiner—Duc Nguyen
(74) Attorney, Agent, or Firm—Marsh Fischmann & Breyfogle LLP

(57) ABSTRACT

An improved telephony system for calling card calls is provided. The system comprises a method and system for allowing preregistered names to be displayed on pager devices when a calling card call is placed to a pager. In the invention, a calling card account number is utilized to retrieve the pre-registered name to be displayed at the pager device. A speed paging option may also be provided. The invention is particularly apt for use in telephony systems having AIN-capable switching devices.

16 Claims, 3 Drawing Sheets

US 6,370,241 B1

TELEPHONY SYSTEM FOR CALLING CARD CALLS

FIELD OF THE INVENTION

The present invention relates to telephony systems, and more particularly, to an improved telephony system for calling card calls.

BACKGROUND OF THE INVENTION

As individuals and businesses have continued to increase their use and reliance upon telephony systems, a variety of technologies and related services have been developed by telephony service providers. In particular, many developments have been made to allow telephony system users to be contacted at or to contact others from locations other than that associated with their primary residential or business telephones.

By way of example, personal pagers are now relied upon heavily in many service industries to enhance the timeliness of customer service and other business-related communications. More particularly, service/sales personnel can receive a paging signal on a portable unit which indicates that someone is attempting to contact them, wherein the portable paging unit displays a telephone number input by the caller. The paged party may then call the paging party at the displayed telephone number as deemed appropriate by the paged party. In this regard, and as will be appreciated, a paged party may be more likely to respond to paging if the displayed number is recognized, thereby benefiting both the paging and paged parties.

Of further particular background interest, telephony services can now be accessed from telephones other than a subscriber's primary telephone, with charges being applied to a subscriber's primary telephone account. More particularly, calling card services are now provided by telephony service providers that allow cardholders to dial in a predetermined calling card account number, pursuant to which the caller may then make a long distance or other telephone call with the associated charges being applied to the telephony service account of the caller. By virtue of calling card services, calling card holders need not enter currency into a public telephone or incur charges against a third-party account when utilizing a third-party telephone.

SUMMARY OF THE INVENTION

A primary objective of the present invention is to provide an improved telephony system for calling card calls, and more particularly to allow calling card callers and their callees to realize greater telephony-related services. In this regard, it is a specific objective to provide enhanced calling card services to calling card holders who attempt to page third-parties, and further, who attempt to page certain parties on a regular basis.

Another general objective of the present invention is to enhance communications between parties utilizing calling card services and paging services.

The above objectives and additional advantages are realized in the present invention which provides an enhanced method and system for handling calling card calls. In this regard, the present invention is applicable to both (i) prepaid calling card calls (i.e., wherein telephony access service is provided on a prepaid basis with charges debited against a prepaid calling card account until the prepaid amount is exhausted), and (ii) to credit-based calling card calls (i.e., wherein a cardholder's account is automatically charged in connection with calls placed and the cardholder is subsequently billed on a periodic basis).

In accordance with the present invention, the system provides for receiving a calling card call from an originating telephone at a predetermined central office switch in a telephony network. In conjunction with such call, a message is provided to the switch, such message including an originating telephone number. Pursuant to receipt of the calling card call, the inventive system then provides a call processing record that includes the originating telephone number and a preregistered name corresponding with the calling card call. The call is then routed with the call processing record to a paging device for communication of the originating telephone number together with the preregistered name. As will be appreciated, the preregistered name may be designated by the holder of the calling card account and, upon display at a paging device, advantageously allows the paged party to make a determination regarding response to the paging communication with the benefit of knowing the preregistered name.

In one aspect of the present invention, the inventive system utilizes a calling card account identifier (e.g., a calling card account no.) to retrieve the preregistered name from a database. Such functionality may be provided by a calling card service control module included within the telephony network. In this regard, the predetermined central office switch may advantageously comprise an AIN-capable switching device (e.g., an Advanced Intelligent Network switch) to suspend call processing while the service control module generates the call processing record for routing the calling card call with the preregistered name.

In another aspect of the present invention, the system may further provide for prompting a caller to select from a plurality of functions at the originating phone, including placement of a paging call. Such prompting may, for example, utilize a visual display at the originating phone and/or may employ prerecorded audible messages or dynamically created audible messages using an intelligent peripheral within the telephony network.

In an additional aspect of the invention, a function selection may be provided for placing a paging call utilizing speed paging. More particularly, the system may allow a caller to input a predetermined designation corresponding with a predetermined paging number, pursuant to which a calling card service control module will act to retrieve the predetermined paging number based on the inputted predetermined designation. Thereafter, the call processing record is provided to include the predetermined paging number without requiring the caller to input the same, thereby enhancing user convenience.

Numerous additional aspects and advantages will be apparent upon consideration of the further description that follows.

DETAILED DESCRIPTION

Figure 1:
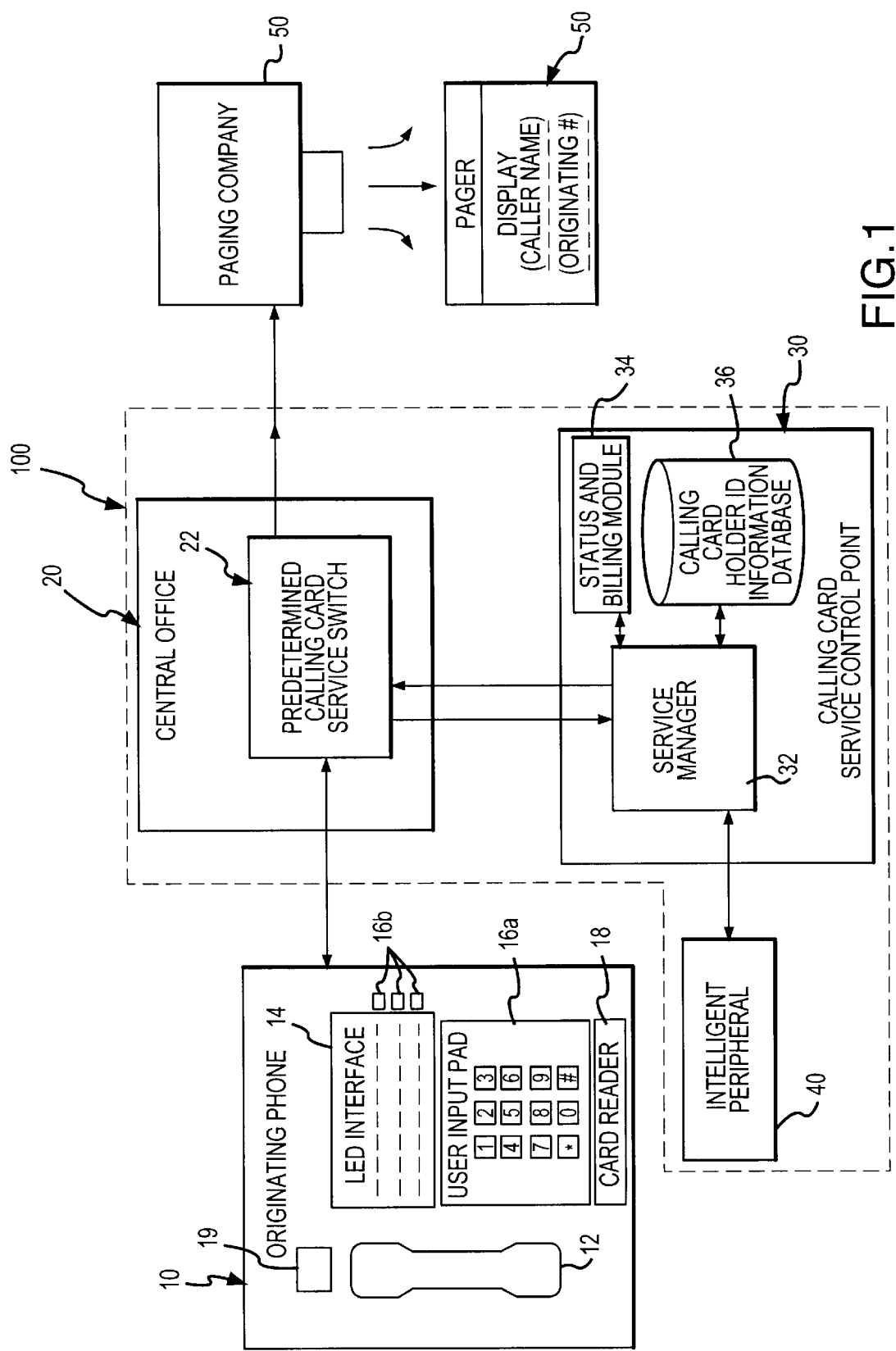
FIG. 1 illustrates a telephony system embodiment of the present invention.

The telephony system embodiment illustrated in FIG. 1 comprises an exemplary originating telephone 10, a central office 20 and calling card service control point 30 within a telephony service network 100, and an exemplary pager device 60. As will be appreciated, numerous originating telephones and pager devices interfacing with network 100 would realize the benefits of the present invention in actual implementation.

In the illustrated embodiment, the originating telephone 10 is a public pay phone. The invention is also applicable to other types of telephones (e.g., a regular residential or business premises phone). As shown in FIG. 1, the originating phone 10 includes a hand-held unit 12 for voice/audible communications, an LED user interface 14 for visual display of function selections and other information to a user, and a user input pad 16*a* for input of user instructions. Phone 10 may also include user function select buttons 16*b* positioned adjacent display lines of LED interface 14 (i.e., for receiving user instructions), and a calling card reader 18 (e.g., for reading a magnetic strip on certain calling cards). Finally, phone 10 includes a currency input assembly 19 for normal pay phone operations. In general, originating phone 10 functions as an originating call switch that launches telephony service messages to central office 20 of the telephony network 100.

In the latter regard, while a single central office 20 is illustrated in FIG. 1, the telephony service network may comprise a number of central offices that collectively serve to complete any given call. By way of example, the telephony service network may include a number of central offices for receiving calls initiated at/directed to telephones within corresponding, different geographic regions, and a number of intermediate central offices that may serve to route calls and interface with service nodes in connection with the handling of a given call.

For purposes of simplicity, a single central office 20 is shown in FIG. 1. Central office 20 includes a plurality of telephony call switching devices, including at least one predetermined calling card service switch 22, i.e., for handling certain calling card calls from originating phone 10. That is, predetermined calling card service switch 22 corresponds with a predetermined calling card service number (i.e., associated with a given calling card service provider). Switch 22 may advantageously have AIN (Advanced Intelligent Network) switching capabilities, e.g., wherein switch 22 is capable of directing a call to a station having a station number different from that dialed at an originating telephone 10 to initiate a call and/or for otherwise suspending call processing pending routing/service instructions.

In the embodiment illustrated in FIG. 1, predetermined calling card service switch 22 is an AIN switch wherein, upon receipt of a calling card call, the calling card service switch 22 will suspend call processing and will launch a message to a calling card service control point 30. As will be appreciated, service control point 30 may be maintained by the calling card service provider corresponding with switch 22. The calling card service control point 30 comprises a service manager 32, a status and billing module 34, and a calling cardholder account and ID information database 36 which functions to complete calling card calls. In general, service control point 30 is operable to prompt/receive service request input messages from the originating phone 10, and to provide a service output message to predetermined calling card service switch 22. Such responsive output message comprises a call processing record for routing the call at the predetermined calling card service switch 22 to pager device 60 as will be further discussed.

The database 36 comprises data records corresponding with various calling card accounts serviced by service control point 30. More particularly, for a given calling card account number, database 36 may advantageously comprise a corresponding, preregistered PIN #, a corresponding, preregistered name, and optionally, a corresponding listing of speed paging designations and corresponding paging numbers. The preregistered name and optional data are pre-established by the account-holder for the calling card account.

The status and billing module 34 is provided to maintain intelligence regarding whether a given calling card account is active (e.g., whether the account is paid up or has been suspended/terminated for nonpayment, or in the case of a prepaid calling card account, whether the amount of prepaid telephony services has been exhausted). Additionally, module 34 is capable of monitoring each given calling card call (e.g., via messages to/from switch 22) for account debiting/charge accrual purposes (e.g., by monitoring the duration of the call). Service manager 32 controls the finctioning of module 34 and access to database 36, as well as prompt messages to, and processing of, messages from originating phone 10. As will be appreciated, service control point 30 may be software-driven to operate per preprogrammed instructions.

In conjunction with the operation of calling card service control point 30, the service manager 32 thereof may interface with an AIN intelligent peripheral device 40 also included within the telephony service network 100. Intelligent peripheral 40 can be provided to enhance functional interaction with a user at originating phone 10. For example, intelligent peripheral 40 may be provided to provide audible messages that prompt a user at originating phone 10 (e.g., via hand-piece 12) to enter a calling card account number, to enter a corresponding personal identification number (PIN #), to select a desired call type (e.g., call to telephone, call to pager device, etc.), and to enter the specific pager station number desired. Such prompt messages may also be provided from service control point 30 for visual display at LED interface 14. In response to such prompts, a user at originating phone 10 may input instructions via use of user inputs 16*a* and/or 16*b*. Alternatively, voice recognition capabilities may be integrated at intelligent peripheral 40 to allow for user voice instruction input via hand-piece 12.

As noted, predetermined calling card service switch 22 is operable so as to route calls from originating phone 10 in accordance with the service output message (i.e., comprising a call processing record) received from calling card service control point 30. Per the illustrated embodiment, such routing may include the routing of a given call to a paging company 50 providing paging services to paging subscribers within a given geographic region. Upon receipt of a call to a given subscriber (i.e., corresponding pager device 60), the paging company 50 will transmit a paging signal to the corresponding pager device 60. In response, the pager device 60 will display information comprising predetermined portions of the transmitted paging signal. In particular, and in accordance with the present invention, such portions may advantageously include a preregistered name corresponding with the calling card account number associated with the call.

Figure 2A:
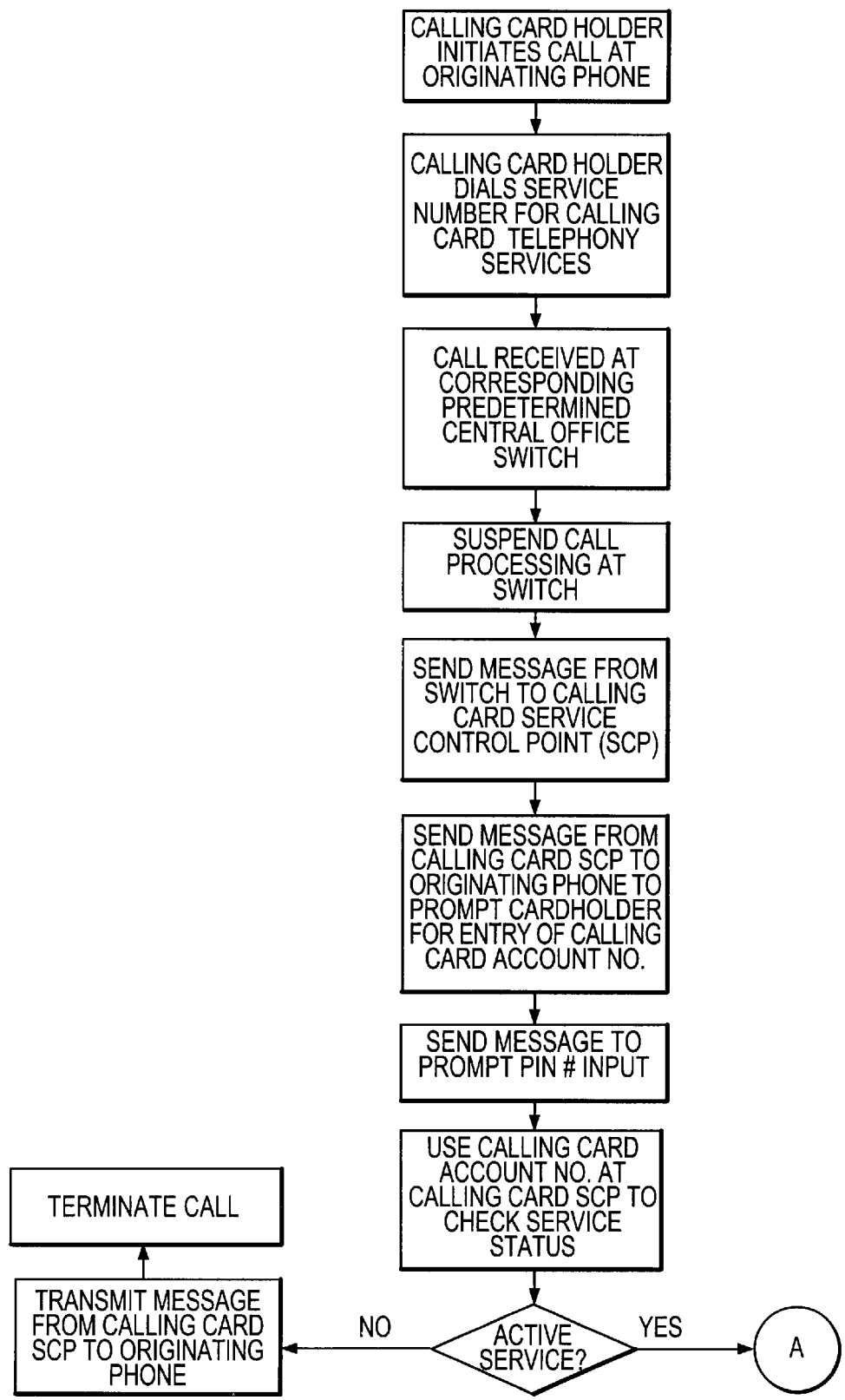
FIGS. 2A and 2B illustrate steps in one process embodiment of the invention.
Figure 2B:
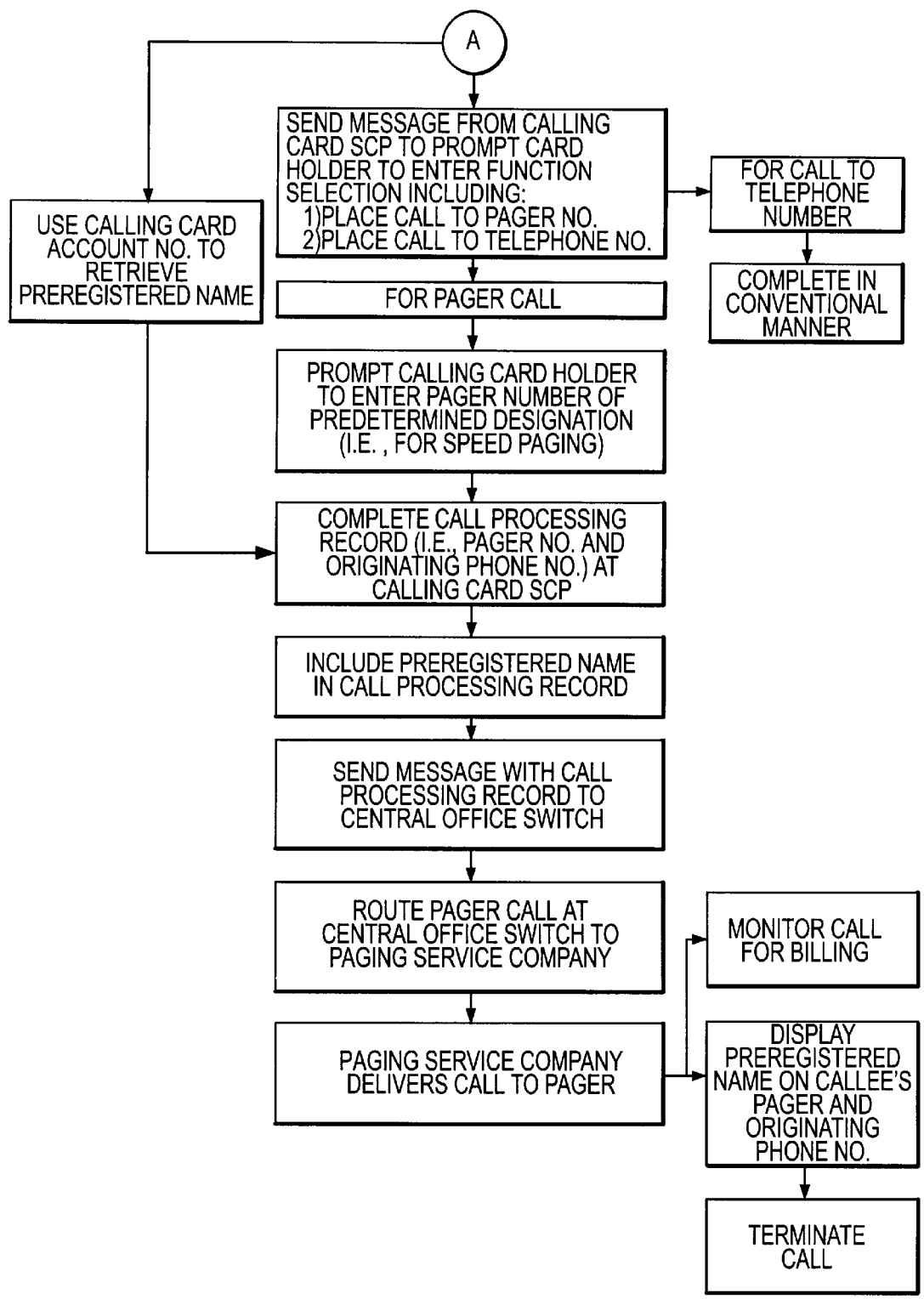

Operation of the telephony system embodiment illustrated in FIG. 1 will now be further explained with reference to the process flow illustrations of FIGS. 2A and 2B. In particular, a calling card cardholder may initiate a calling card call by obtaining a dial tone at originating telephone 10 and dialing a service number corresponding with a calling card service provider (e.g., a 1-800-xxx-xxxx number). The calling card call is then received at the predetermined central office switch 22 corresponding with the service number dialed, whereupon call processing is suspended at the predetermined switch 22 and a message is sent to a calling card service control point 30. Upon receipt of such message, the service manager 32 at service control point 30 will send a message back to the originating telephone 10 prompting the caller to enter a calling card account number.

It should be noted that, in the event the calling card utilized comprises a magnetic strip, it may not be necessary for the calling cardholder to dial the predetermined calling card service number or enter a calling card account number. Rather, in such instances, card reader 18 at originating phone 10 will read an encoded calling card service number and calling card account number from the magnetic strip on the calling card and automatically utilize such data to initiate a call to predetermined calling switch 22 (e.g., with the calling card account number being transmitted to switch 22 and manger 32 with such call).

Upon receipt of a calling card account number, the service manager 32 may then send a further message to the originating telephone 10 prompting the caller to input a personal identification number (i.e., PIN #) corresponding with the calling card account. At the same time, the service manager 32 may consult database 36 to retrieve the preregistered PIN # for the calling card account number. Upon receipt of the PIN # input at the originating telephone 10, the service manager 32 may then compare the input PIN # with the preregistered PIN #, and if the numbers are the same, will proceed with calling card procedures. If not, the service manager 32 can send a message to the originating telephone 10 indicating that an incorrect PIN # was entered and prompting the caller to reenter the PIN #. Alternatively, (e.g., after a predetermined number of reentry attempts) the service manager 30 can send a message to the central office switch 22 that terminates the call.

Assuming that the correct PIN # is inputted by the caller, the service manager 32 may consult status module 34 and/or database 36 to confirm that the calling card service is active. If not, a message can be sent by manager 32 to the caller at phone 10 and the call subsequently terminated. If a calling card service is active, service control manager 32 may send another message to the originating telephone 10 to prompt the calling card holder to select a function from options comprising, for example: normal telephone call dialing, speed telephone call dialing, normal paging, or speed paging call dialing. In the event a normal page calling function is desired, the service manager 32 will then transmit another message to originating telephone 10 requesting the caller to input the paging number to be dialed. In the event speed paging is desired, the service manager 32 will prompt the caller to enter a predetermined designation corresponding with a predetermined paging number to be called. In this regard, the predetermined designation may advantageously comprise fewer characters than the paging number to be dialed, thereby providing the caller with enhanced convenience.

Upon input or retrieval of the paging number to be called, the service manager 32 may then complete a call processing record for call routing. In this regard, the service manager will utilize the telephone number corresponding with the originating telephone as initially received from central office switch 22 and the paging number to be called. Of importance, service manager 32 will also include within the call processing record, a preregistered name corresponding with the calling card account number. In this regard, service manager 32 will utilize the calling card account number associated with the call to retrieve the preregistered name from database 36.

Upon completion of the call processing record, service manager 32 will then transmit a message to the predetermined central office switch 22 that includes the call processing record, whereupon the central office switch will route the call utilizing the paging number portion of the call processing record. As will be appreciated, the paging company 50 providing service to the paged party will then send a paging signal to the pager device 60 of the paged party. Such paging signal will include that portion of the call processing record corresponding with the telephone number for the originating telephone and the corresponding, retrieved preregistered name. Such information may then be displayed on the pager device 60. As will be appreciated, the display of such information at pager device 60 will allow the paged party to make a determination regarding placement of a call in response to the page with the benefit of knowing the caller's likely identity (i.e., the preregistered name). This will be of particular benefit in situations where a paged party does not recognize the telephone number for an originating telephone and may not otherwise prioritize the placement of a return call absent the identification of a known caller.

The description provided above is for purposes of illustration only. The various aspects and features of the present invention can be applied in a variety of other embodiments. Such applications and other apparent modifications are intended to be within the scope of the present invention as defined by the claims which follow.

What is claimed is:

1. A method for handling calling card calls in a telephony system comprising:

receiving a calling card call from an originating telephone at a predetermined central office switch in a telephony network, wherein a message is provided to said predetermined central office switch in connection with said calling card call, and said message including an originating telephone number corresponding with the originating telephone;

transmitting a message to the originating telephone which includes a query as to whether the calling card call is for transmitting a page or placing a conventional voice call;

if a first indication is received, performing normal telephone call dialing;

if a second indication is received, performing a search of a an information database using a calling card account identifier associated with the calling card call which is input at the originating telephone and providing a call processing record associated with the calling card account identifier that includes said originating telephone number, a preregistered name corresponding with said calling card call and an identified paging number which is associated with the calling card account identifier in the database, wherein the account identifier has at least one paging number associated therewith and the identified paging number is based upon a predetermined, corresponding designation input at said originating telephone; and routing said calling card call with said call processing record to a pager device associated with any pager number entered from the originating telephone as part of the originating telephone call at the predetermined central office switch, for communication of said originating telephone number and said preregistered name.

2. A method as claimed in claim 1, further comprising:

prompting a caller at said originating telephone to select one of a plurality of calling functions, one of said calling functions providing for the placement of a call to a pager device; and completing said providing step responsive to a calling function selection input at the originating telephone for placement of a paging call.

3. A method as claimed in claim 1, wherein said predetermined central office switch is AIN capable, and further comprising:

forwarding said call processing record received at said predetermined central office switch to a service control point within said telephony network; and suspending processing of said calling card call pending receipt of said call processing record at said predetermined central office switch from said service control point.

4. A method as claimed in claim 1, further comprising:

displaying said originating telephone number and said preregistered name at said pager device.

5. A method as claimed in claim 2, said prompting step including:

transmitting at least one message from an intelligent peripheral in the telephony network to said originating telephone, wherein an audible prompt is provided at said originating telephone.

6. A method as claimed in claim 1, wherein at least one of said calling card account identifier and a calling card service number corresponding with said switch is read from a magnetic strip on a calling card at said originating telephone.

7. A method as claimed in claim 6, further comprising:

comparing a personal identification number input at said originating telephone with a preregistered personal identification number prior to said routing step.

8. A method as claimed in claim 7, further comprising:

checking a service status of a calling card account corresponding with said preregistered name prior to said routing step.

9. A method as claimed in claim 1, further comprising:

monitoring said calling card call to determine one of a debit amount and credit charge amount to be applied against a calling card account corresponding with said preregistered name.

10. A telephony system for handing calling card calls comprising:

a predetermined central office switch for receiving a calling card call from an originating telephone; and a calling card service control module for receiving at least one service input message from said predetermined central office switch in response to receipt of said calling card call at said predetermined central office switch, said at least one service input message including a calling card account number corresponding with said calling card call, said calling card service control module being further configured to transmit to the originating telephone through the predetermined central office switch a query as to whether the calling card call is for transmitting a page or placing a conventional voice call and then if a first indication is received processing a normal dialed call and if a second indication is received utilizing said calling card account number to retrieve a corresponding preregistered name from a database which includes for each of a plurality of different calling card account numbers, a set of predetermined designations corresponding with predetermined paging numbers, and a given paging number is retrievable from said database based upon a corresponding predetermined designation input at the originating telephone, wherein said preregistered name is automatically transmittable with said calling card call to a pager device associated with any pager number entered at the originating telephone as part of the originating telephone call at the predetermined central office switch.

11. A system as claimed in claim 10, further comprising:

a paging function identifier for identifying information input at said originating telephone, said identifying information comprising said paging number.

12. A system as claimed in claim 11, said paging function identifier comprising:

an interface at said originating telephone for presenting a plurality of function selections to a caller, said function selections including placement of a paging call, and for receiving a function selection input from a caller.

13. A system as claimed in claim 10, wherein said predetermined central office switch is operable to suspend call processing upon receipt of said calling card call and to complete said calling card call upon receipt of a service output message from said service control module, said service output message including a telephone number corresponding with said originating telephone and said preregistered name.

14. A system as claimed in claim 13, wherein said predetermined central office switch comprises an AIN-capable switching device.

15. A system as claimed in claim 13, wherein said service output message further comprises:

said paging number.

16. A system as claimed in claim 15, wherein each of said telephone number and said preregistered name are displayable on said pager device.

* * * * *

UNITED STATES PATENT AND TRADEMARK OFFICE
CERTIFICATE OF CORRECTION

PATENT NO. : 6,370,241 B1
DATED : April 9, 2002
INVENTOR(S) : Clark

It is certified that error appears in the above-identified patent and that said Letters Patent is hereby corrected as shown below:

<u>Title page,</u>
Item [73], delete the word "Quest", and insert therefor -- Qwest --;

<u>Column 4,</u>
Line 17, delete the word "finctioning", and insert therefor -- functioning --.

Signed and Sealed this

Eleventh Day of June, 2002

Attest:

JAMES E. ROGAN
Attesting Officer
Director of the United States Patent and Trademark Office